United States Patent
Van Der Puy et al.

(10) Patent No.: US 11,149,105 B2
(45) Date of Patent: Oct. 19, 2021

(54) AMINE CATALYSTS FOR POLYURETHANE FOAMS

(71) Applicant: HONEYWELL INTERNATIONAL INC., Morris Plains, NJ (US)

(72) Inventors: Michael Van Der Puy, Amherst, NY (US); David J. Williams, East Amherst, NY (US); Haridasan K. Nair, Williamsville, NY (US); David Nalewajek, West Seneca, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/160,438

(22) Filed: Oct. 15, 2018

(65) Prior Publication Data
US 2019/0315905 A1  Oct. 17, 2019

Related U.S. Application Data

(62) Division of application No. 15/378,297, filed on Dec. 14, 2016, now abandoned, which is a division of application No. 12/241,606, filed on Sep. 30, 2008, now Pat. No. 9,550,854.

(60) Provisional application No. 60/979,453, filed on Oct. 12, 2007.

(51) Int. Cl.
| | |
|---|---|
| *C08G 18/18* | (2006.01) |
| *C08G 18/40* | (2006.01) |
| *C08J 9/14* | (2006.01) |
| *C08G 101/00* | (2006.01) |

(52) U.S. Cl.
CPC ..... *C08G 18/1808* (2013.01); *C08G 18/1816* (2013.01); *C08G 18/40* (2013.01); *C08J 9/144* (2013.01); *C08J 9/146* (2013.01); *C08J 9/149* (2013.01); *C08G 2101/00* (2013.01); *C08G 2110/0025* (2021.01); *C08G 2115/02* (2021.01); *C08J 2203/162* (2013.01); *C08J 2203/164* (2013.01); *C08J 2203/18* (2013.01); *C08J 2205/046* (2013.01); *C08J 2205/10* (2013.01); *C08J 2375/04* (2013.01)

(58) Field of Classification Search
CPC ........ C08G 18/08; C08G 18/10; C08G 18/18; C08G 18/1808; C08G 18/1816; C08G 18/40; C08G 2101/00; C08G 2101/0025; C08G 2105/02; C08J 9/144; C08J 9/146; C08J 9/149; C08J 2203/162; C08J 2203/164; C08J 2203/18; C08J 2205/046; C08J 2205/10; C08J 2375/04
See application file for complete search history.

(56) References Cited

U.S. PATENT DOCUMENTS

| | | | |
|---|---|---|---|
| 9,550,854 B2 * | 1/2017 | Van Der Puy | C08G 18/1816 |
| 2002/0013379 A1 * | 1/2002 | Singh | C08G 18/4208 |
| | | | 521/174 |
| 2006/0014843 A1 * | 1/2006 | Tanaka | C08J 9/149 |
| | | | 521/99 |
| 2006/0022166 A1 * | 2/2006 | Wilson | C08J 9/144 |
| | | | 252/68 |

* cited by examiner

*Primary Examiner* — John M Cooney
(74) *Attorney, Agent, or Firm* — Colleen D. Szuch

(57) ABSTRACT

The invention provides polyurethane and polyisocyanurate foams and methods for the preparation thereof. More particularly, the invention relates to open-celled, polyurethane and polyisocyanurate foams and methods for their preparation. The foams are characterized by a fine uniform cell structure and little or no foam collapse. The foams are produced with a polyol premix composition which comprises a combination of a hydrohaloolefin blowing agent, a polyol, a silicone surfactant, and a sterically hindered amine catalyst.

16 Claims, No Drawings

AMINE CATALYSTS FOR POLYURETHANE FOAMS

CROSS REFERENCE TO RELATED APPLICATION

This application is a division of U.S. application Ser. No. 15/378,297 filed Dec. 14, 2016, which is a division of U.S. application Ser. No. 12/241,606, filed Sep. 30, 2008 (now U.S. Pat. No. 9,550,854, issued Jan. 24, 2017) which application claims the benefit of Provisional patent application Ser. No. 60/979,453 filed Oct. 12, 2007, which is incorporated herein by reference.

BACKGROUND OF THE INVENTION

Field of the Invention

The present invention pertains to polyurethane and polyisocyanurate foams and methods for the preparation thereof. More particularly, the invention relates to rigid, polyurethane and polyisocyanurate foams and methods for their preparation, which foams are characterized by a fine uniform cell structure and little or no foam collapse. The foams are produced with an organic polyisocyanate and a polyol premix composition which comprises a combination of a blowing agent, which is preferably a hydrohaloolefin, a polyol, a silicone surfactant, and an amine catalyst.

Description of the Related Art

The class of foams known as low density, rigid polyurethane or polyisocyanurate foams has utility in a wide variety of insulation applications including roofing systems, building panels, building envelope insulation, refrigerators and freezers. A critical factor in the large-scale commercial acceptance of rigid polyurethane foams has been their ability to provide a good balance of properties. Rigid polyurethane and polyisocyanurate foams are known to provide outstanding thermal insulation, excellent fire resistance properties, and superior structural properties at reasonably low densities. The foam industry has historically used liquid fluorocarbon blowing agents because of their ease of use in processing conditions. Fluorocarbons not only act as blowing agents by virtue of their volatility, but also are encapsulated or entrained in the closed cell structure of the rigid foam and are the major contributor to the low thermal conductivity properties of the rigid urethane foams. The use of a fluorocarbon as the preferred commercial expansion or blowing agent in insulating foam applications is based in part on the resulting k-factor associated with the foam produced. The k-factor is defined as the rate of transfer of heat energy by conduction through one square foot of one-inch thick homogenous material in one hour where there is a difference of one degree Fahrenheit perpendicularly across the two surfaces of the material. Since the utility of closed-cell polyurethane-type foams is based, in part, on their thermal insulation properties, it would be advantageous to identify materials that produce lower k-factor foams.

It is known in the art to produce rigid polyurethane and polyisocyanurate foams by reacting a polyisocyanate with a polyol in the presence of a blowing agent, a catalyst, a surfactant, and optionally other ingredients. Blowing agents include hydrocarbons, fluorocarbons, chlorocarbons, fluorochlorocarbons, halogenated hydrocarbons, ethers, esters, aldehydes, ketones, or $CO_2$ generating materials. Heat generated when the polyisocyanate reacts with the polyol volatilizes the blowing agent contained in the liquid mixture, thereby forming bubbles therein. As the polymerization reaction proceeds, the liquid mixture becomes a cellular solid, entrapping the blowing agent in the foam's cells. If a surfactant is not used in the foaming composition, the bubbles simply pass through the liquid mixture without forming a foam or forming a foam with large, irregular cells rendering it not useful. Preferred blowing agents have low global warming potential. Among these are hydrohaloolefins including hydrohaloolefins (HFOs) of which trans-1,3,3,3-tetrafluoropropene (HFO-1234ze) is of particular interest and hydrochlorofluoroolefins (HFCOs) of which 1-chloro-3,3,3-trifluoropropene (HFCO-1233zd) is of particular interest. Processes for the manufacture of 1,3,3,3-tetrafluoropropene are disclosed in U.S. Pat. Nos. 7,230,146 and 7,189,884. Processes for the manufacture of 1-chloro-3,3,3-trifluoropropene are disclosed in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optional isocyanate compatible raw materials comprise the first component, commonly referred to as the "A" component. A polyol or mixture of polyols, surfactant, catalyst, blowing agent, and other isocyanate reactive and non-reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or reaction site. Most conveniently, however, they are all incorporated into one B component.

A shortcoming of two-component systems, especially those using certain hydrohaloolefins, including HFO-1234ze and HFCO-1233zd is the shelf-life of the B-side composition. Normally when a foam is produced by bringing together the A and B side components, a good foam is obtained. However, if the polyol premix composition is aged, prior to treatment with the polyisocyanate, the foams are of lower quality and may even collapse during the formation of the foam.

It has now been found that the origin of the problem is the reaction of certain amine catalysts with certain hydrohaloolefins including HFO-1234ze and HFCO-1233zd, resulting in partial decomposition of the blowing agent. It has been found that, subsequent to the decomposition of the blowing agent, the molecular weight of the polymeric silicone surfactants, if present, is detrimentally altered, leading to poor foam structure.

While it is possible to solve the problem by separating the blowing agent, surfactant, and catalyst, for example by adding the blowing agent, amine catalyst, or surfactant to the polyisocyanate, ("A" component) or by introducing the blowing agent, amine catalyst, or surfactant using a separate stream from the "A" or "B" component, a preferred solution is one that does not require reformulation or a change in the way the foams are made.

It has now been found that sterically hindered amines have lower reactivity toward certain blowing agents, such as hydrohaloolefins including trans HFO-1234ze and HFCO- 1233zd, such that good quality foams can be produced even if the polyol blend has been aged.

DESCRIPTION OF THE INVENTION

The invention provides a polyol premix composition which comprises a combination of a blowing agent, a polyol, a silicone surfactant, and a sterically hindered amine catalyst; wherein the blowing agent comprises a hydrohaloolefin, and optionally a hydrocarbon, fluorocarbon, chlorocarbon, fluorochlorocarbon, halogenated hydrocarbon, $CO_2$ generating material, or combinations thereof; wherein the sterically hindered amine catalyst has the formula $R_1R_2N$-$[A$-$NR3]_n R_{24}$ wherein each of $R_1$, $R_2$, $R_3$, and $R_4$ is independently H, a $C_1$ to $C_8$ alkyl group, a $C_1$ to $C_8$ alkenyl group, a $C_1$ to $C_8$ alcohol group, or a $C_1$ to $C_8$ ether group, or $R_1$ and $R_2$ together form a $C_5$ to $C_7$ cyclic alkyl group, a $C_5$ to $C_7$ cyclic alkenyl group, a $C_5$ to $C_7$ heterocyclic alkyl group, or a $C_5$ to $C_7$ heterocyclic alkenyl group; A is a $C_1$ to $C_5$ alkyl group, a $C_1$ to $C_5$ alkenyl group, or an ether; n is 0, 1, 2, or 3; with the proviso that the sterically hindered amine catalyst has a sum of Charton's steric parameters of about 1.65 or greater.

The invention also provides a method of preparing a polyurethane or polyisocyanurate foam comprising reacting an organic polyisocyanate with the polyol premix composition.

The blowing agent component comprises a hydrohaloolefin, preferably comprising at least one of trans-HFO-1234ze and HFCO-1233zd., and optionally a hydrocarbon, fluorocarbon, chlorocarbon, fluorochlorocarbon, halogenated hydrocarbon, ether, fluorinated ether, ester, aldehyde, ketone, $CO_2$ generating material, or combinations thereof.

The hydrohaloolefin preferably comprises at least one halooalkene such as a fluoroalkene or chloroalkene containing from 3 to 4 carbon atoms and at least one carbon-carbon double bond. Preferred hydrohaloolefins non-exclusively include trifluoropropenes, tetrafluoropropenes such as (HFO-1234), pentafluoropropenes such as (HFO-1225), chlorotrifloropropenes such as (HFO-1233), chlorodifluoropropenes, chlorotrifluoropropenes, chlorotetrafluoropropenes, and combinations of these. More preferred that the compounds of the present invention are the tetrafluoropropene, pentafluoropropene, and chlorotrifloropropene compounds in which the unsaturated terminal carbon has not more than one F or Cl substituent. Included are 1,3,3,3-tetrafluoropropene (HFO-1234ze); 1,1,3,3-tetrafluoropropene; 1,2,3,3,3-pentafluoropropene (HFO-1225ye), 1,1,1-trifluoropropene; 1,1,1,3,3-pentafluoropropene (HFO-1225zc); 1,1,1,3,3,3-hexafluorobut-2-ene; 1,1,2,3,3-pentafluoropropene (HFO-1225yc); 1,1,1,2,3-pentafluoropropene (HFO-1225yez); 1-chloro-3,3,3-trifluoropropene (HFCO-1233zd); 1,1,1,4,4,4-hexafluorobut-2-ene or combinations thereof, and any and all structural isomers, geometric isomers or stereoisomers of each of these.

Preferred hydrohaloolefins have a Global Warming Potential (GWP) of not greater than 150, more preferably not greater than 100 and even more preferably not greater than 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. Preferred hydrohaloolefins also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Preferred optional blowing agents non-exclusively include water, formic acid, organic acids that produce $CO_2$, when they react with an isocyanate; hydrocarbons; ethers, halogenated ethers; pentafluorobutane; pentafluoropropane; hexafluoropropane; heptafluoropropane; trans-1,2 dichloroethylene; methyl formate; 1-chloro-1,2,2,2-tetrafluoroethane; 1,1-dichloro-1-fluoroethane; 1,1,1,2-tetrafluoroethane; 1,1,2,2-tetrafluoroethane; 1-chloro 1,1-difluoroethane; 1,1,1,3,3-pentafluorobutane; 1,1,1,2,3,3,3-heptafluoropropane; trichlorofluoromethane; dichlorodifluoromethane; 1,1,1,3,3,3-hexafluoropropane; 1,1,1,2,3,3-hexafluoropropane; difluoromethane; difluoroethane; 1,1,1,3,3-pentafluoropropane; 1,1-difluoroethane; isobutane; normal pentane; isopentane; cyclopentane, or combinations thereof. The blowing agent component is usually present in the polyol premix composition in an amount of from about 1 wt. % to about 30 wt. %, preferably from about 3 wt. % to about 25 wt. %, and more preferably from about 5 wt. % to about 25 wt. %, by weight of the polyol premix composition. When both a hydrohaloolefin and an optional blowing agent are present, the hydrohaloolefin component is usually present in the blowing agent component in an amount of from about 5 wt. % to about 90 wt. %, preferably from about 7 wt. % to about 80 wt. %, and more preferably from about 10 wt. % to about 70 wt. %, by weight of the blowing agent component; and the optional blowing agent is usually present in the blowing agent component in an amount of from about 95 wt. % to about 10 wt. %, preferably from about 93 wt. % to about 20 wt. %, and more preferably from about 90 wt. % to about 30 wt. %, by weight of the blowing agent component.

The polyol component, which includes mixtures of polyols, can be any polyol which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b):

(a) glycerine, ethylene glycol, diethylene glycol, trimethylolpropane, ethylene diamine, pentaerythritol, soy oil, lecithin, tall oil, palm oil, castor oil;

(b) ethylene oxide, propylene oxide, a mixture of ethylene oxide and propylene oxide; or combinations thereof. The polyol component is usually present in the polyol premix composition in an amount of from about 60 wt. % to about 95 wt. %, preferably from about 65 wt. % to about 95 wt. %, and more preferably from about 70 wt. % to about 90 wt. %, by weight of the polyol premix composition.

The polyol premix composition next contains a silicone surfactant. The silicone surfactant is used to form a foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Goldschmidt AG of Essen, Germany. Others are disclosed in U.S. Pat. Nos. 2,834,748; 2,917,480; 2,846,458 and 4,147,847. The silicone surfactant component is usually present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may optionally contain a non-silicone, non-ionic surfactant. Such may include oxythylated alkylphenols, oxyethylated fatty alcohols, paraffin oils, castor oil esters, ricinoleic acid esters, turkey red oil, groundnut oil, paraffins and fatty alcohols. A preferred non-silicone non-ionic surfactant is LK-443 which is commercially available from Air Products Corporation. When a non-silicone, non-ionic surfactant used, it is usually present in the polyol premix composition in an amount of from about 0.25 wt. % to about 3.0 wt. %, preferably from about 0.5 wt. % to about 2.5 wt. %, and more preferably from about 0.75 wt. % to about 2.0 wt. %, by weight of the polyol premix composition.

The inventive polyol premix composition next contains at least one sterically hindered amine catalyst having the formula $R_1R_2N\text{-}[A\text{-}NR_3]_nR_4$ wherein each of $R_1$, $R_2$, $R_3$, and $R_4$ is independently H, a $C_1$ to $C_8$ alkyl group, a $C_1$ to $C_8$ alkenyl group, a $C_1$ to $C_8$ alcohol group, or a $C_1$ to $C_8$ ether group, or $R_1$ and $R_2$ together form a $C_5$ to $C_7$ cyclic alkyl group, a $C_5$ to $C_7$ cyclic alkenyl group, a $C_5$ to $C_7$ heterocyclic alkyl group, or a $C_5$ to $C_7$ heterocyclic alkenyl group; A is a $C_1$ to $C_5$ alkyl group, a $C_1$ to $C_5$ alkenyl group, or an ether; n is 0, 1, 2, or 3; with the proviso that the sterically hindered amine catalyst has a sum of Charton's steric parameters of about 1.65 or greater.

Charton's steric parameters for a group x are determined by: comparing the rates of acid catalyzed hydrolysis of substituted esters $XCH_2C(O)OR$ with the rate of the hydrolysis of the corresponding unsubstituted ester. The differences correlate in linear fashion with the Van der Waals radii of X (see R. W. Taft in "Steric effects in organic chemistry," M. S. Newman, ed., Wiley, New York, N.Y., 1956 p 556 and M. Charton, J. Am. Chem. Soc., 97 (1975) 1552), which are incorporated herein by reference. A list of the values v can be found in M. Charton, *J. Organic Chemistry*, 41 (1976), 2217, which is incorporated herein by reference. Values for selected groups are given in the following table.

| GROUP | v |
|---|---|
| H | 0 |
| Me | 0.52 |
| t-Bu | 1.24 |
| $CCl_3$ | 1.38 |
| $CBr_3$ | 1.56 |
| $CI_3$ | 1.79 |
| $CF_3$ | 0.91 |
| $Me_3Si$ | 1.40 |
| F | 0.27 |
| Cl | 0.55 |
| Br | 0.65 |
| I | 0.78 |
| Ph | 1.66 |
| Et | 0.56 |
| Pr | 0.68 |
| Bu | 0.68 |
| $BuCH_2$ | 0.68 |
| $BuCH_2CH_2$ | 0.73 |
| $Bu(CH_2)_3$ | 0.73 |
| $Bu(CH_2)_4$ | 0.68 |
| i-$PrCH_2$ | 0.98 |
| t-$BuCH_2$ | 1.34 |
| s-$BuCH_2$ | 1.00 |
| i-$PrCH_2CH_2$ | 0.68 |
| t-$BuCH_2CH_2$ | 0.70 |
| t-$BuCHEtCH_2CH_2$ | 1.01 |
| c-$C_6H_{11}CH_2$ | 0.97 |
| c-$C_6H_{11}CH_2\ CH_2$ | 0.70 |
| c-$C_6H_{11}(CH_2)_3$ | 0.71 |
| i-Pr | 0.76 |
| s-Bu | 1.02 |
| $Et_2CH$ | 1.51 |
| $Pr_2CH$ | 1.54 |
| $Bu_2CH$ | 1.56 |
| (i-$PrCH_2)_2CH$ | 1.70 |
| (t-$BuCH_2)_2CH$ | 2.03 |
| i-PrCHEt | 2.11 |
| t-BuCHMe | 2.11 |
| t-$BuCH_2$CHMe | 1.41 |
| c-$C_6H_{11}$ | 0.87 |
| t-$BuCMe_2$ | 2.43 |
| t-$BuCH_2CMe_2$ | 1.74 |
| $Et_3C$ | 2.38 |
| $PhCH_2$ | 0.70 |
| $PhCH_2CH_2$ | 0.70 |
| $Ph(CH_2)_3$ | 0.70 |
| $Ph(CH_2)_4$ | 0.70 |
| PhMeCH | 0.99 |
| PhEtCH | 1.18 |
| $Ph_2CH$ | 1.25 |
| $ClCH_2$ | 0.60 |
| $BrCH_2$ | 0.64 |
| $Cl_2CH$ | 0.81 |
| $Br_2CH$ | 0.89 |
| $Br_2CMe$ | 1.46 |
| $Me_2CBr$ | 1.39 |
| $CH_2F$ | 0.62 |
| $CH_2I$ | 0.67 |
| $CH_2CN$ | 0.89 |
| $CHI_2$ | 0.97 |
| $CHF_2$ | 0.68 |
| c-$C_3H_5$ | 1.06 |
| c-$C_4H_7$ | 0.51 |
| c-$C_5H_9$ | 0.71 |
| EtPrCH | 1.51 |
| n-$C_9H_{19}$ | 0.68 |
| n-$C_{11}H_{22}$ | 0.68 |
| n-$C_{13}H_{27}$ | 0.68 |
| n-$C_{15}H_{31}$ | 0.68 |
| n-$C_{17}H_{35}$ | 0.68 |
| cis-$H(CH_2)_8CH\!=\!CH(CH_2)_{11}$ | 0.67 |
| trans-$H(CH_2)_8CH\!=\!CH(CH_2)_{11}$ | 0.68 |
| i-$Pr(CH_2)_3$ | 0.68 |
| MePrCH | 1.05 |
| Me($C_2H_3$CH)CH | 1.04 |
| MeBuCH | 1.07 |
| Me($PhCH_2$)CH | 0.98 |
| Me-i-PrCH | 1.29 |
| Me-i-BuCH | 1.09 |
| EtBuCH | 1.55 |

-continued

| GROUP | v |
|---|---|
| c-C$_7$H$_{13}$ | 1.00 |
| MeOCH$_2$ | 0.63 |
| PrOCH$_2$ | 0.65 |
| i-PrOCH$_2$ | 0.67 |
| BuOCH$_2$ | 0.66 |
| i-BuOCH2 | 0.62 |
| MeOCH$_2$CH$_2$ | 0.89 |
| EtOCH$_2$CH$_2$ | 0.89 |
| PrOCH$_2$CH$_2$ | 0.89 |
| i-PrOCH$_2$CH$_2$ | 0.87 |
| BuOCH$_2$CH$_2$ | 0.89 |
| i-BuOCH$_2$ CH$_2$ | 0.89 |
| MeO(CH$_2$)$_3$ | 0.69 |
| EtO(CH$_2$)$_3$ | 0.69 |
| PrO(CH$_2$)$_3$ | 0.70 |
| BuO(CH$_2$)$_3$ | 0.71 |
| 9-Ethyl-9-fluorenyl | 1.53 |
| 9-Isopropyl-9-fluorenyl | 2.21 |
| 9-tert-Butyl-9-fluorenyl | 2.63 |
| 9-Phenyl-9-fluorenyl | 2.10 |
| 9-Butyl-9-fluorenyl | 1.59 |
| 9-Benzyl-9-fluorenyl | 1.63 |
| 9-OH-9-fluorenyl | 0.98 |
| 9-Anthracenyl | 1.18 |
| 10-Xanthyl | 1.18 |
| 10-Thioxanthyl | 1.42 |
| C$_2$H$_3$Ph$_2$CCH$_2$ | 2.74 |
| PhOCH$_2$ | 0.74 |
| EtOCH$_2$ | 0.61 |
| MeO(CH$_2$)4 | 0.68 |
| EtO(CH$_2$)$_4$ | 0.67 |
| HOCH$_2$CH$_2$ | 0.77 |
| MeSCH$_2$ | 0.70 |
| MeSCH$_2$CH$_2$ | 0.78 |
| EtSCH$_2$CH$_2$ | 0.79 |
| ICH$_2$CH$_2$ | 0.93 |
| ClCH$_2$CH$_2$ | 0.97 |
| MeOCH$_2$CH$_2$OCH$_2$ | 0.57 |
| EtOCH$_2$CH$_2$OCH$_2$ | 0.56 |
| PrOCH$_2$CH$_2$OCH$_2$ | 0.56 |
| BuOCH$_2$CH$_2$OCH$_2$ | 0.55 |
| MeO(CH$_2$)$_3$OCH$_2$ | 0.62 |
| MeOCH$_2$CH$_2$OCHMe | 0.67 |
| MeOCH$_2$CH$_2$OCH$_2$ CH$_2$OCH$_2$ | 0.56 |
| CH$_2$OH | 0.53 |
| MeCHOH | 0.50 |
| EtCHOH | 0.71 |
| PrCHOH | 0.71 |
| BuCHOH | 0.70 |
| BuCH$_2$CHOH | 0.71 |
| EtC=O | 0.79 |
| PrC=O | 0.80 |
| EtCHOMe | 1.22 |
| PrCHOMe | 1.22 |
| BuCHOMe | 1.20 |
| C$_2$H$_3$ | 1.51 |
| H$_2$H$_3$CH$_2$ | 0.69 |
| C$_2$H$_3$CH$_2$CH$_2$ | 0.75 |
| C$_2$H$_3$CH$_2$CH$_2$CH$_2$ | 0.75 |
| Ph$_2$CMe | 2.34 |
| Ph$_2$CEt | 2.75 |
| Ph$_3$C | 2.92 |
| 9-Fluorenyl | 1.08 |
| 9-Methyl-9-fluorenyl | 1.41 |
| EtSCH$_2$ | 0.71 |
| PhSCH$_2$ | 0.82 |
| (EtS)$_2$CH | 1.39 |
| EtSCHMe | 1.10 |
| 2,5-Dithiacyclopentyl | 0.89 |
| 2,6-Dithiacyclohexyl | 1.16 |
| t-BuOOCMe$_2$ | 1.49 |
| t-BuOCH$_2$CMe$_2$ | 1.30 |
| t-BuCH$_2$OCMe$_2$ | 1.23 |
| C$_2$H$_3$ | 1.31 |
| CMe=CH$_2$ | 1.56 |
| C$_2$H$_3$CH$_2$CH$_2$ | 0.74 |

Useful sterically hindered amines include a sterically hindered primary amine, secondary amine or tertiary amine. Useful sterically hindered tertiary amine catalysts non-exclusively include dicyclohexylmethylamine; ethyldiisopropylamine; dimethylcyclohexylamine; dimethylisopropylamine; methylisopropylbenzylamine; methylcyclopentylbenzylamine; isopropyl-sec-butyl-trifluoroethylamine; diethyl-(α-phenylethyl)amine, tri-n-propylamine, or combinations thereof. Useful sterically hindered secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl)amine; or combinations thereof. Useful sterically hindered primary amine catalysts non-exclusively include: triphenylmethylamine and 1,1-diethyl-n-propylamine.

Other useful sterically hindered amines includes morpholines, imidazoles, ether containing compounds, and the like. These include
dimorpholino diethylether
N-ethylmorpholine
N-methylmorpholine
bis(dimethylaminoethyl) ether
imidizole
n-methylimidazole
1,2-dimethylimidazole
dimorpholinodimethylether
N,N,N',N',N",N"-pentamethyldiethylenetriamine
N,N,N',N',N",N"-pentaethyldiethylenetriamine
N,N,N',N',N",N"-pentamethyldipropylenetriamine
bis(diethylaminoethyl) ether
bis(dimethylaminopropyl) ether The sterically hindered amine catalyst is usually present in the polyol premix composition in an amount of from about 0.1 wt. % to about 3.5 wt. %, preferably from about 0.2 wt. % to about 3.0 wt. %, and more preferably from about 0.5 wt. % to about 2.5 wt. %, by weight of the polyol premix composition.

In another embodiment of the invention, the sterically hindered amine component contains at least one of the aforesaid sterically hindered tertiary amine catalysts and at least one of the sterically hindered secondary amine catalysts.

The polyol premix composition may optionally further comprise a non-amine catalyst. Suitable non-amine catalysts may comprise an organometallic compound containing bismuth, lead, tin, titanium, antimony, uranium, cadmium, cobalt, thorium, aluminum, mercury, zinc, nickel, cerium, molybdenum, vanadium, copper, manganese, zirconium, sodium, potassium, or combinations thereof. These non-exclusively include bismuth nitrate, lead 2-ethylhexoate, lead benzoate, ferric chloride, antimony trichloride, antimony glycolate, stannous salts of carboxylic acids, zinc salts of carboxylic acids, dialkyl tin salts of carboxylic acids, potassium acetate, potassium octoate, potassium 2-ethylhexoate, glycine salts, quaternary ammonium carboxylates, alkali metal carboxylic acid salts, and N-(2-hydroxy-5-nonylphenol)methyl-N-methylglycinate, tin (II) 2-ethylhexanoate, dibutyltin dilaurate, or combinations thereof. When the optional non-amine catalyst is used, it is usually present in the polyol premix composition in an amount of from about 0.01 wt. % to about 2.5 wt. %, preferably from about 0.05 wt. % to about 2.25 wt. %, and more preferably from about 0.10 wt. % to about 2.00 wt. %. by weight of the polyol premix composition. While these are usual amounts, the quantity amount of metallic catalyst can vary widely, and the appropriate amount can be easily determined by those skilled in the art.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124.605; and 3,201,372. Preferred as a class are the aromatic polyisocyanates.

Representative organic polyisocyanates correspond to the formula:

R(NCO)z wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5-'tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-diphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4, 4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl) methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis(phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis (phenyl isocyanate), toluene diisocyanates, or combinations thereof. In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl) aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. Formic acid is also used to produce carbon dioxide by reacting with the isocyanate and is optionally added to the "B" component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The following non-limiting examples serve to illustrate the invention.

Example 1 (Comparative)

In this example the reaction of a the tertiary amine catalyst, pentamethyldiethylenetriamine (Polycat 5), and trans-1,3,3,3-tetrafluoropropene (HFO-1234ze) was investigated by heating the two together in a glass pressure reactor for 2 days at 120° F. Over the 2-day period, the physical state of the liquid phase was monitored as well as the total system pressure. At the end of the experiment, the liquid phase was analyzed for fluoride ion. In this example, the pressure decreased 44% after one day and 65% after 2 days. After the first day, an orange solid was present. Analysis of the liquid using ion chromatography indicated >5 weight % fluoride ion (>50,000 ppm).

Examples 2-5 (Comparative)

In these examples, other amines were evaluated similarly at 120° F. for 3 days using approximately equimolar amounts of amine and trans-1,3,3,3-tetrafluoropropene. The amine, pressure drop (%), physical change, and fluoride found are given.
1,8-Diazabicyclo[5.4.0]undecene-7, 80%, red-orange solid, >5 weight %; 1,4-diazabicyclooctane in dipropylene glycol (DABCO 33-LV®), 25%, orange viscous liquid, >5 weight %; N-methylcyclohexylamine, 86%, white precipitate followed by orange liquid, >5 weight %; N-isopropylmethylamine, 78%; orange solution; >5 weight %. The drop in pressure during the test, the presence of solid, and the change in color are all indications of reaction between the amine and olefin. The % fluoride ion in the residue is a quantitative measurement of the extent of reaction. Greater than 5 wt % fluoride is unacceptably high and represents extensive decomposition of the olefin.

Examples 6-8 (Comparative)

These amines were treated with trans-1,3,3,3-tetrafluoropropene at room temperature (77-78 F) for 3 days. N-methylcyclohexylamine, 48%, yellow-orange solid, 5 wt %;
Di-n-propylamine, 56%, precipitate in 30 minutes; >5 wt %;
Isopropylamine, 45%, solid in 5 minutes, >5 wt %. In these examples, decomposition of the olefin was still extensive, even at room temperature.

Example 9 (Comparative)

A polyol (B Component) formulation was made up of 100 parts by weight of a polyol blend, 1.5 parts by weight Niax L6900 silicone surfactant, 3 parts by weight water, 8 parts by weight triethyl phosphate flame retardant, 1 part by weight N, N, N', N", N" pentamethyldiethylenetriamine (sold as Polycat 5 by Air Products) catalyst and 8 parts by weight trans-1,3,3,3-tetrafluoropropene blowing agent. The total B component composition, when freshly prepared and combined with 217.3 parts by weight of Lupranate M20S polymeric isocyanate yielded a good quality foam with a fine and regular cell structure. Foam reactivity was typical for a pour in place foam with a gel time of 80 seconds. The total B component composition (121.5 parts) was then aged at 120° F. for 62 hours, and then combined with 217.3 parts of M20S Iso polyisocyanate to make a foam. The foam collapsed during formation. Due to the foam collapse, no get time could be determined. The polyol formulation turned yellow during aging. This result shows that 5 wt % fluoride, as found in the screening test of Example 1, represented sufficient decomposition to result in foam collapse.

Example 10-17

The following amines were heated 3 days at 120 F with trans-1,3,3,3-tetrafluoropropene (trans-HFO-1234ze) using approximately equimolar amounts of amine and HFO-1234ze. The amine and fluoride found are given. Dimethylcyclohexylamine (Polycat 8), 1970 ppm;
diisopropylamine, 7650 ppm; dicyclohexylmethylamine (Polycat 12), 480 ppm; diisopropylethylamine, 67 ppm; dicyclohexylamine, 942 ppm; di-sec-butylamine, 203 ppm; t-butylisopropylamine, 237 ppm; dimethylisopropylamine, 3474 ppm. Using these amines, the amount of fluoride produced (and therefore the amount of olefin decomposition) in the three-day test was much less than that in the comparative examples. The amount of fluoride produced generally decreased with increasingly hindered amines.

Example 18 (Foam Tests)

A polyol (B Component) formulation was made up of 100 parts by weight of a polyol blend, 1.5 parts by weight Niax L6900 silicone surfactant, 3 parts by weight water, 8 parts by weight triethyl phosphate flame retardant, 0.7 parts by weight N,N-dimethylcyclohexylamine (sold as Polycat 8 by Air Products) catalyst and 8 parts by weight trans1,3,3,3-tetrafluoropropene blowing agent. The total B component composition, when freshly prepared and combined with 217.3 parts by weight of Lupranate M20S polymeric isocyanate yielded a good quality foam with a fine and regular cell structure. Foam reactivity was typical of a slow reacting pour in place foam with a gel time of 285 seconds. The total B-side composition (119.7 parts) was then aged at 120° F. for 62 hours, and then combined with 217.3 parts of M20S Iso polyisocyanate to make a foam. The foam was normal in appearance without cell collapse. Gel time was 300 seconds. No discoloration was noted during aging. This test confirmed the screening test of example 10, that is, the low fluoride produced in the test successfully predicted that good foam could be made with this amine, even after aging.

Example 19 (Comparative)

A polyol (B Component) formulation was made up of 100 parts by weight of a polyol blend, 1.5 parts by weight Niax L6900 silicone surfactant, 1.5 parts by weight water, 1.2 part by weight N, N, N', N", N" pentamethyldiethylenetriamine (sold as Polycat 5 by Air Products) catalyst and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam with a gel time of 78 seconds. The total B-side composition (112.2 parts) was then aged at 120° F. for 62 hours, and then combined with 120.0 parts of M20S Iso polyisocyanate to make a foam. The foam collapsed during formation. Due to the foam collapse, no get time could be determined. The polyol formulation turned yellow during aging.

Example 20 (Foam Tests)

A polyol (B Component) formulation was made up of 100 parts by weight of a polyol blend, 1.5 parts by weight Niax L6900 silicone surfactant, 1.5 parts by weight water, 8.0 part by weight diisopropylethylamine catalyst and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam with a gel time of 187 seconds. The total B-side composition (119.0 parts) was then aged at 120° F. for 62 hours, and then combined with 120.0 parts of M20S Iso polyisocyanate to make a foam. The foam was normal in appearance without cell collapse. Gel time was 190 seconds. No discoloration was noted during aging.

Example 21 (Foam Tests)

A polyol (B Component) formulation was made up of 100 parts by weight of a polyol blend, 1.5 parts by weight Niax L6900 silicone surfactant, 1.5 parts by weight water, 8.0 part by weight dicyclohexylmethylamine (sold as Polycat 12 by Air Products and Chemicals) catalyst and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam with a gel time of 150 seconds. The total B-side composition (115.0 parts) was then aged at 120° F. for 62 hours, and then combined with 120.0 parts of M20S Iso polyisocyanate to make a foam. The foam was normal in appearance without cell collapse. Gel time was 136 seconds. No discoloration was noted during aging.

These examples show that the use of non-sterically hindered amines as catalysts produce polyol premixes that are not stable over time as evidenced by cell coalescence and foam collapse. When sterically hindered tertiary amines are substituted for the non-sterically hindered amines, this instability is not observed and good quality foam is produced using both fresh and aged polyol premixes ("B" components).

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A polyol premix composition which has been aged for a period of at least three days and which comprises a combination of a blowing agent comprising trans-1-chloro-3,3,3-trifluoropropene (transHFCO-1233zd), a polyol, a silicone surfactant, and an amine catalyst comprising one or more morpholines and/or one or more imidazoles.

2. The polyol premix composition of claim 1 wherein the blowing agent further comprises water, formic acid, organic acids that produce $CO_2$ when they react with an isocyanate, hydrocarbons; ethers, esters, aldehydes, ketones, halogenated ethers; pentafluorobutane; pentafluoropropane; hexafluoropropane; heptafluoropropane; trans-1,2 dichloroethylene; methyl formate; 1-chloro-1,2,2,2-tetrafluoroethane; 1,1-dichloro-1-fluoroethane; 1,1,1,2-tetrafluoroethane; 1,1,1,2-tetrafluoroethane; 1-chloro 1,1-difluoroethane; 1,1,1,3,3-pentafluorobutane; 1,1,1,2,3,3,3-heptafluoropropane; trichlorofluoromethane; dichlorodifluoromethane; 1,1,1,3,3,3-hexafluoropropane; 1,1,1,2,3,3-hexafluoropropane; difluoromethane; difluoroethane; 1,1,1,3,3-pentafluoropropane; 1,1-difluoroethane; isobutane; normal pentane; isopentane; cyclopentane, or combinations thereof.

3. The polyol premix composition of claim 1 wherein the silicone surfactant comprises a polysiloxane polyoxyalkylene block co-polymer.

4. The polyol premix composition of claim 1 further comprising a non-silicone, non-ionic surfactant.

5. The polyol premix composition of claim 1 wherein the polyol comprises one or more of a sucrose containing polyol; phenol; a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b):
 (a) glycerine, ethylene glycol, diethylene glycol, trimethylolpropane, ethylene diamine, pentaerythritol, soy oil, lecithin, tall oil, palm oil, castor oil;
 (b) ethylene oxide, propylene oxide, a mixture of ethylene oxide and propylene oxide; or combinations thereof.

6. The polyol premix composition of claim 1 wherein the amine catalyst comprises dimorpholinodiethylether.

7. The polyol premix composition of claim 1 wherein the amine catalyst comprises N-ethylmorpholine.

8. The polyol premix composition of claim 1 wherein the amine catalyst comprises N-methylmorpholine.

9. The polyol premix composition of claim 1 wherein the amine catalyst comprises dimorpholinodimethylether.

10. The polyol premix composition of claim 1 wherein the amine catalyst comprises imidizole.

11. The polyol premix composition of claim 1 wherein the amine catalyst comprises n-methylimidazole.

12. The polyol premix composition of claim 1 wherein the amine catalyst comprises 1,2-dimethylimidazole.

13. A foamable composition comprising a mixture of an organic polyisocyanate and the polyol premix composition of claim 1.

14. The foamable composition of claim 13 wherein the organic polyisocyanate comprises a polymethylene polyphenyl isocyanate, methylenebis(phenyl isocyanate), toluene diisocyanate, or combinations thereof.

15. A method of preparing a polyurethane or polyisocyanurate foam comprising reacting an organic polyisocyanate with the polyol premix composition of claim 1.

16. A foam produced according to the method of claim 15, wherein said foam includes closed cells that contain at least a portion of said blowing agent.

\* \* \* \* \*